Figure 1:
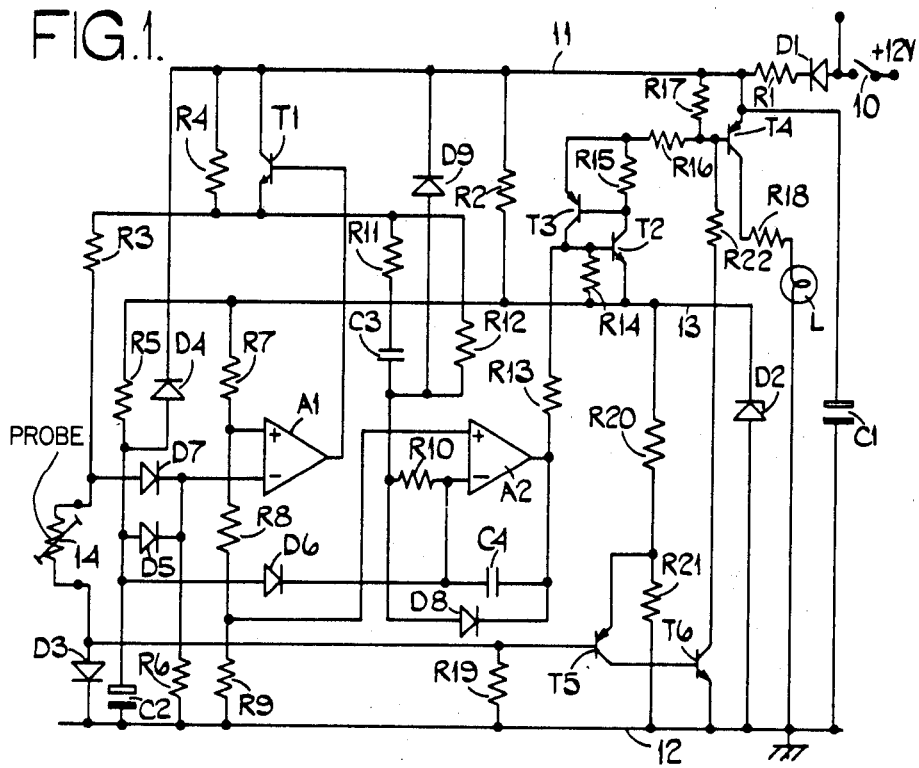

United States Patent [19]

Williams et al.

[11] 4,283,719
[45] Aug. 11, 1981

[54] LIQUID LEVEL SENSING CIRCUIT

[75] Inventors: David G. Williams, Birmingham; Paul A. Harris, Walsall, both of England

[73] Assignee: Lucas Industries Limited, Birmingham, England

[21] Appl. No.: 64,642

[22] Filed: Aug. 7, 1979

[30] Foreign Application Priority Data

Aug. 23, 1978 [GB] United Kingdom ............... 34265/78

[51] Int. Cl.³ ............................................. G08B 21/00
[52] U.S. Cl. .................................. 340/620; 73/304 R
[58] Field of Search ............... 340/618, 599, 620, 588, 340/589; 73/295, 304 R, 313

[56] References Cited

U.S. PATENT DOCUMENTS

| 2,742,634 | 4/1956 | Bergen et al. | 340/599 X |
|---|---|---|---|
| 2,901,740 | 8/1959 | Cutsogeorge | 340/599 X |
| 3,350,710 | 10/1967 | Bridges | 340/622 X |
| 3,376,568 | 4/1968 | Stewart et al. | 73/313 X |
| 3,547,145 | 12/1970 | Holzer | 137/392 |
| 3,740,740 | 6/1973 | Milo | 73/295 X |
| 3,911,744 | 10/1975 | Edwards | 73/304 R |
| 3,932,852 | 1/1976 | Hill | 340/620 |
| 3,943,767 | 3/1976 | Efferson | 73/295 |
| 4,102,191 | 7/1978 | Harris | 73/304 R X |
| 4,163,391 | 8/1978 | Bezard et al. | 73/304 R X |
| 4,185,207 | 1/1980 | Bengtsson | 340/622 X |

FOREIGN PATENT DOCUMENTS 2085952 12/1971 France .
2367276 5/1978 France .

Primary Examiner—Donald J. Yusko
Assistant Examiner—Daniel Myer
Attorney, Agent, or Firm—Schwartz, Jeffery, Schwaab, Mack, Blumenthal & Koch

[57] ABSTRACT

A liquid level sensing apparatus includes a probe having a high positive temperature coefficient of resistivity. The probe is connected in a circuit including an operational amplifier and a series transistor which maintains the voltage across the probe constant for a fixed period following switching on of the apparatus and which produces a voltage signal related to the current flowing in the probe. This voltage signal is differentiated by a differentiating circuit to provide a signal indicating the rate of change of the voltage signal from which it is determined whether or not the probe is immersed in a cooling liquid. A warning lamp is actuated by a latching switch circuit when the probe is not immersed. A second example is described in which the probe current is maintained at a fixed level and the rate of change of the voltage across it is monitored.

21 Claims, 2 Drawing Figures

LIQUID LEVEL SENSING CIRCUIT

This invention relates to a liquid level sensing circuit of the generally known type in which a probe in the form of a resistive wire having a high temperature co-efficient is immersed in the liquid to be sensed and its behaviour when a heating current is passed through it is monitored by a detector circuit.

To allow for the variation of the resistance of the probe with ambient temperature one known form of apparatus of the kind referred to above makes use of a signal storage means for storing a signal representing the probe resistance at the instant of commencement of current flow through the probe. With such an arrangement, however, the length of time required to measure the effect of passing the heating current through the probe can be substantial and the circuit also has other inconvenience, such as the requirement for a relatively high supply voltage to ensure that signals can be stored corresponding to the initial resistance of the probe over its full range of ambient temperatures.

It is an object of the present invention to provide a liquid level sensing circuit of the kind referred to in which at least some of the disadvantages of the known circuit are overcome.

In accordance with the invention there is provided a liquid level sensing apparatus including a resistive probe having a high positive temperature co-efficient of resistivity, a circuit for applying either a controlled current or a controlled voltage to said probe for a predetermined test period, and means sensitive to a voltage signal developed as a result of current flow in the probe, said voltage sensitive means including a differentiating circuit so that the voltage sensitive means detects the rate of change of said voltage signal.

With such an arrangement the initial value of the voltage signal when current flow in the probe is initiated is of no significance, but the initial voltage transient which occurs at initiation of probe current can be used to set the output of the differentiating circuit into an initial state.

Preferably the differentiating circuit is a passive circuit from which an output is taken via an amplifier connected to operate as an integrator.

Figure 2:
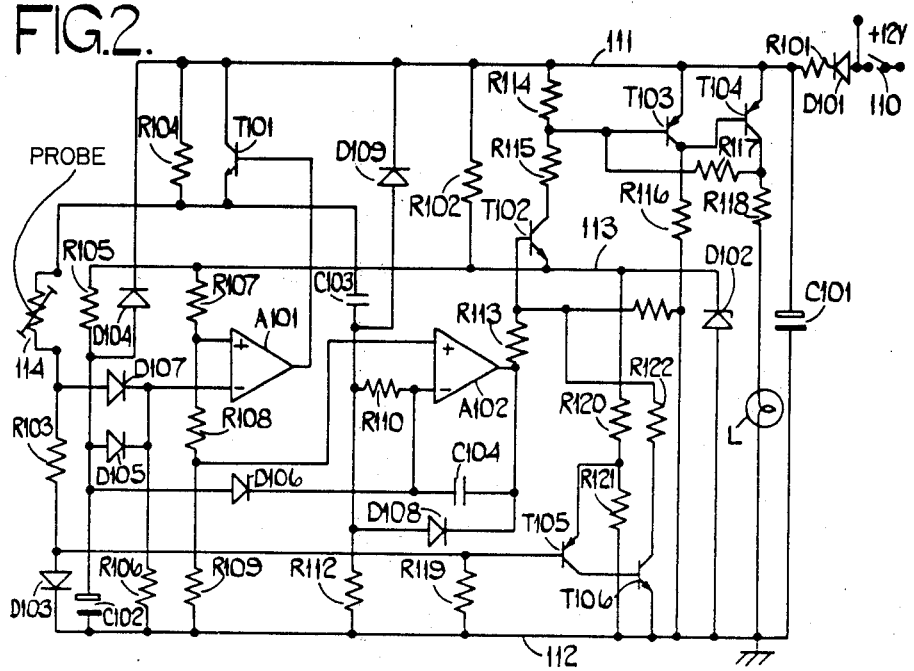

In the accompanying drawings FIGS. 1 and 2 are circuit diagrams of two embodiments of the invention.

The circuit shown in FIG. 1 is intended to sense the level of oil in a vehicle engine oil sump each time the vehicle ignition switch is closed. The ignition switch 10 connects the vehicle battery to the anode of a protective diode $D_1$, the cathode of which is connected via a resistor $R_1$ to a positive supply rail 11. A capacitor $C_1$ is connected between rail 11 and an earth rail 12. There is a further positive supply rail 13 which is connected to rail 11 by a resistor $R_2$ and to the rail 12 by a zener diode $D_2$. Two operational amplifiers $A_1$ and $A_2$ have their supply terminals (not shown) connected to the rails 11, 12.

The amplifier $A_1$ is connected to regulate the voltage applied to a resistive probe 14 for a fixed period following each closure of the switch 10. To this end one end of the probe 14 is connected to the earth rail 12 via a diode $D_3$ and its other end is connected by two resistors $R_3$, $R_4$ in series to the rail 11. An npn transistor $T_1$ has its collector connected to the rail 11, its emitter connected to the junction of resistors $R_3$ and $R_4$ and its base connected to the output terminal of the amplifier $A_1$. A resistor $R_5$ is connected at one end to the rail 13 and at the other end is connected by a capacitor $C_2$ to the rail 12. Said other end of resistor $R_5$ is connected to the anodes of three diodes $D_4$, $D_5$ and $D_6$, the cathode of diode $D_4$ being connected to the rail 11 and the cathodes of diodes $D_5$ and $D_6$ being connected to the inverting input terminals of respective ones of the amplifiers $A_1$, $A_2$. A resistor $R_6$ connects the inverting input terminal of the amplifier $A_1$ to the rail 12. Three resistors $R_7$, $R_8$ and $R_9$ are connected in series between the rails 13 and 12 and the junction of resistors $R_7$ and $R_8$ is connected to the non-inverting input terminal of the amplifier $A_1$. A further diode $D_7$ connects said other end of the probe 14 to the inverting input terminal of amplifier $A_1$.

The diodes $D_5$ and $D_7$ constitute a "high wins" gate such that the higher of the voltages at the anodes of such diodes is delivered to the inverting input of the amplifier $A_1$.

When the switch 10 is opened capacitor $C_2$ can discharge completely via the diode $D_4$ so that at the instant of switch-on the voltage on the anode of diode $D_5$ is zero. Current flowing through resistors $R_7$, $R_8$ and $R_9$ will bias the non-inverting input of amplifier $A_1$ positively, whilst the inverting input thereof will be at substantially ground potential, since the resistance of resistor $R_4$ is high compared with the combined resistance of resistor $R_3$, the probe 14 and diode $D_3$. There are roughly similar voltage drops across diodes $D_3$ and $D_7$. As a result, the output of amplifier $A_1$ goes high and switches on the transistor $T_1$, thereby increasing the current in the probe until the voltage at the inverting input terminal of the amplifier $A_1$ is the same as that at the non-inverting input. The current through the probe is thereafter adjusted automatically to maintain this voltage until the capacitor $C_2$ charges up sufficiently to win the gate $D_5$, $D_7$. The output of amplifier $A_1$ then falls, turning off transistor $T_1$ and ending the test sequence for amplifier $A_1$.

During the "constant probe voltage" period, the voltage at the junction of the resistors $R_3$, $R_4$ is linearly dependent on the resistance of the probe 14, so that if the current in probe 14 causes its temperature to rise, the voltage at this junction will fall.

The amplifier $A_2$ is connected to detect changes in the voltage at the junction of resistors $R_3$, $R_4$ and thereby detect any changes in the resistance of the probe 14. To this end, the amplifier $A_2$ has its non-inverting input connected to the junction of resistors $R_8$ and $R_9$ and its inverting input terminal connected by a resistor $R_{10}$ to one side of a capacitor $C_3$, the other side of which is connected by a further resistor $R_{11}$ to the junction of resistors $R_3$ and $R_4$, yet another resistor $R_{12}$ connected said one side of capacitor $C_3$ to this same junction. The resistors $R_{11}$, $R_{12}$ and the capacitor $C_3$ effectively form a passive differentiating circuit. There are two feedback paths around the amplifier $A_2$, one of which consists of a capacitor $C_4$ connected between the output terminal of amplifier $A_2$ and the inverting input terminal thereof and the other consisting of a diode $D_8$ with its cathode connected to the output terminal of the amplifier $A_2$ and its anode connected to said one side of the differentiating capacitor $C_3$. A discharge diode $D_9$ connects said one side of capacitor $C_3$ to the rail 11 to enable capacitor $C_3$ to discharge when switch 10 is open.

The initial positive-going voltage transient which occurs at switch-on causes the output of amplifier $A_2$ to become negative with respect to the inverting input terminal so that diode $D_8$ conducts until the voltages at the two inputs of amplifier $A_2$ are at the same voltage. The resistor $R_{11}$ limits the positive excursion of the junction of resistor $R_{10}$ with capacitor $C_3$ during this stage and in so doing limits the amplitude of any oscillatory transients which may exist in the output of amplifier $A_2$.

If the probe 14 is immersed in oil the voltage at the junction of resistors $R_3$ and $R_4$ will remain sensibly constant throughout the test period and after the switch-on transient, no further current will flow in resistor $R_{11}$ and capacitor $C_3$. There will be a voltage across resistor $R_{12}$ which is equal to the sum of the voltages across resistor $R_3$ with diode $D_7$ and resistor $R_8$ respectively, so that current will flow through $R_{12}$ and, to maintain the operational amplifier $A_2$ inputs at the same voltage, the output of the amplifier $A_2$ will fall sufficiently to allow this current to pass through the diode $D_8$.

If the probe is in air, on the other hand, it will heat up as a result of the current and its resistance will rise causing the voltage at the junction of resistors $R_3$ and $R_4$ to fall. During the initial transient the diode $D_8$ will provide amplifier feedback, but as the voltage signal starts to fall current will flow through the capacitor $C_3$ and resistor $R_{11}$. The value of resistor $R_{12}$ is such that it cannot conduct sufficient current to maintain the voltage at the inverting input of the amplifier $A_2$ which will tend to go negative relative to the non-inverting input. Thus the output of amplifier $A_2$ will go positive, cutting off the current in diode $D_8$. In this event the resistor $R_{10}$ and capacitor $C_4$ define the transfer function of the amplifier $A_2$ which thus acts as an integrator with a time constant significantly shorter than that of the differentiating circuit so as to minimise the noise sensitivity of the circuit and also to introduce into the output of amplifier $A_2$ an element related to the average rate of change of the voltage signal.

The connection of diode $D_6$ to the inverting input of amplifier $A_2$ ensures that the output of amplifier $A_2$ goes low before the end of the "constant probe voltage" period, since the voltage on capacitor $C_2$ reaches the voltage at the junction of resistors $R_8$, $R_9$ before it reaches that at the junction of resistors $R_7$, $R_8$. Thus, when the probe is immersed, the amplifier $A_2$ is effectively blocked before the falling voltage transient occurs at the end of the "constant probe voltage" period.

The output of amplifier $A_2$ is used to trigger a latch circuit controlling a warning lamp L. The output terminal of amplifier $A_2$ is connected by a resistor $R_{13}$ to the base of an npn transistor $T_2$, the emitter of which is connected to the rail 13. A resistor $R_{14}$ is connected between the base of the transistor $T_2$ and the rail 13. The collector of the transistor $T_2$ is connected by three resistors $R_{15}$, $R_{16}$ and $R_{17}$ in series to the rail 11, the junction of resistors $R_{15}$ and $R_{16}$ being connected to the emitter of a pnp transistor $T_3$, the base of which is connected to the collector of the transistor $T_2$ and the collector of which is connected to the base of the transistor $T_2$. When the output of the amplifier $A_2$ goes high transistor $T_2$ starts turning on and positive feedback through transistor $T_3$ regeneratively switches it fully on. Thus, if at any time during the detection period the output of amplifier $A_2$ goes sufficiently high, the transistors $T_2$ and $T_3$ turn on and stay on until the ignition switch is opened again.

The lamp L is controlled by a further pnp transistor $T_4$ which has its emitter connected to the rail 11, its base connected to the junction of the resistors $R_{16}$ and $R_{17}$ and its collector connected by a resistor $R_{18}$ and the lamp L to the rail 12.

The circuit shown also includes a probe fault detecting circuit of which the diode $D_3$ forms a part. A resistor $R_{19}$ is connected across the diode $D_3$ and the anode of diode $D_3$ is connected to the base of a pnp transistor $T_5$, the emitter of which is connected to the junction of two resistors $R_{20}$ and $R_{21}$ which are connected in series between the rails 12, 13. The collector of the transistor $T_5$ is connected to the base of an npn transistor $T_6$ the emitter of which is connected to the rail 12 and the collector of which is connected by a resistor $R_{22}$ to the base of the transistor $T_4$.

Whenever there is current flowing through diode $D_3$ the transistor $T_5$ is turned off, its emitter being biased by resistors $R_{20}$, $R_{21}$ to a voltage less than one diode voltage drop above earth. Should there be no current flow through diode $D_3$ either as a result of the probe being open circuit or short-circuited to earth, current can flow through the emitter-base of transistor $T_5$ and the resistor $R_{19}$, thereby turning on transistors $T_5$, $T_6$ and hence $T_4$ to light the lamp L. The lamp remains lit even after the "constant voltage" period has ended because there will still be no current through diode $D_3$.

Turning now to FIG. 2, the ignition switch 110 connects the battery by a diode $D_{101}$ in series with a resistor $R_{101}$ to a rail 111. The zener stabilised rail 113 is connected to rail 111 as in FIG. 1 and a zener diode $D_{102}$ connects rail 113 to the earth rail 112. The probe 114 has one end connected by a resistor $R_{103}$ to the diode $D_{103}$ (corresponding to diode $D_3$ in FIG. 1) and its other side connected directly to resistor $R_{104}$ (corresponding to resistor $R_4$). The input to the inverting input terminal is taken from said one end of probe 114 via the diode $D_{107}$ and the other parts surrounding amplifier $A_{101}$ correspond exactly to those in FIG. 1 with reference numerals increased by 100. The probe current is now controlled by amplifier $A_{101}$ to maintain the voltage across resistor $R_{103}$ constant i.e., the probe current is constant. The voltage at said other end of the probe 114 thus rises with rising temperature (instead of falling as in FIG. 1).

The circuit surrounding amplifier $A_{102}$ is correspondingly altered to enable it to detect an opposite voltage excursion, the principle difference being that capacitor $C_{103}$ is connected between the probe 114 and a resistor $R_{112}$ which is connected to the rail 112.

In operation the initial voltage transient at switch-on is a positive going one will cause the output of amplifier $A_{102}$ to go negative as before, feedback being provided by the diode $D_{108}$. If the probe is immersed in oil, the voltage at the input of the differentiating circuit $C_{103}$, $R_{112}$ will remain constant and current flowing through resistor $R_{112}$ will cause the output of amplifier $A_{102}$ to swing positively at a rate determined by resistor $R_{110}$ and capacitor $C_{104}$. If the probe is in air the voltage signal will continue to rise after the transient thereby causing the output of amplifier $A_{102}$ to remain low with diode $D_{108}$ conducting.

As a result of this inversion of the mode of operation of amplifier $A_{102}$ the lamp drive circuit is modified somewhat as follows. A resistor $R_{113}$ connects the output of amplifier $A_{102}$ to the base of an npn transistor $T_{102}$ the emitter of which is connected to the rail 113 and the collector of which is connected to the rail 111 by two resistors $R_{114}$, $R_{115}$ in series. The junction of resistors $R_{114}$, $R_{115}$ is connected to the base of a pnp transistor $T_{103}$ which has its emitter connected to the rail 111 and its collector connected by a resistor $T_{116}$ to the rail 112. The collector of the transistor $T_{103}$ is connected to the base of a pnp transistor $T_{104}$ which has its emitter connected to the rail 111 and its collector connected by a resistor $R_{118}$ and the lamp L in series to the rail 112. A resistor $R_{117}$ is connected between the collector of transistor $R_{104}$ and the base of the transistor $T_{103}$.

When the output of amplifier $A_{102}$ rises as a result of the probe being immersed, it will turn on the transistor $T_{102}$ which turns on transistor $T_{103}$. Transistor $T_{103}$ diverts current in resistor $R_{116}$ away from the base of transistor $T_{104}$ which starts turning off. As a result current flows through resistor $R_{117}$ turns transistor $T_{103}$ on harder, thereby providing the required latch action.

When the probe is in air, transistor $T_{102}$ fails to turn on so that the warning lamp is illuminated.

The transistor $R_{122}$, which corresponds to resistor $R_{22}$ in FIG. 1 connects the collector of transistor $T_{105}$ to the base of the transistor $T_{102}$, so that the absence of current in diode $D_{103}$ causes the lamp to turn on as before.

We claim:

1. A liquid level sensing apparatus comprising a resistive probe having a high positive temperature co-efficient of resistivity, a circuit for applying a controlled electrical signal to said probe for a predetermined test period, and means sensitive to a voltage signal developed as a result of said electrical signal applied to said probe, said voltage sensitive means including a differentiating circuit having a time constant so that the voltage sensitive means detects the rate of change of said voltage signal.

2. Apparatus as claimed in claim 1 in which said differentiating circuit is a passive differentiating circuit.

3. Apparatus as claimed in claim 2 in which said voltage sensitive means also includes an integrating circuit having a time constant which receives as an input the output signal of the passive differentiating circuit.

4. Apparatus as claimed in claim 3 in which the integrating circuit is an active integrating circuit comprising an amplifier, said amplifier including a inverting input, said inverting input connected to the output of the passive differentiating circuit by means of a resistor and an output connected by means of an integrating capacitor to said inverting input.

5. Apparatus as claimed in claim 4 further comprising a diode connected between the output of the passive differentiating circuit and the output of said amplifier.

6. Apparatus as claimed in any one of claims 3 to 5 inclusive in which the time constant of the integrating circuit is significantly shorter than that of the passive differentiating circuit.

7. Apparatus as claimed in claim 1 in which said circuit for applying said controlled electrical signal to the probe comprises an operational amplifier having a reference voltage supplied to one of its input terminals, means for applying, to the other input terminal of the operational amplifier, a voltage signal related to the current through said probe, and means, connected to the output of said operational amplifier including a control element in series with the probe, for controlling the current in the probe so that said voltage signal is made equal to the reference voltage.

8. Apparatus as claimed in claim 7 in which said control element is a transistor having its collector-emitter path in series with the probe and its base connected to the output of the operational amplifier.

9. Apparatus as claimed in claim 8 in which the collector-emitter path of said transistor, a resistor and the probe in that order are connected in series across a supply; the junction of the resistor and the probe being connected to said other input of the operational amplifier so that the voltage signal applied to said other input of the operational amplifier and is related to the voltage across the probe.

10. Apparatus as claimed in claim 9 including a further operational amplifier, wherein the differentiating circuit comprises a resistor in parallel with the series combination of a resistor and a capacitor, said differentiating circuit being connected at one end to the junction of the resistor which is in series with the probe and the collector-emitter path of the transistor, and at the other end to an input resistor of said further operational amplifier said further operational amplifier including a feedback capacitor and comprising an active integrating circuit means.

11. Apparatus as claimed in claim 10 further including a latching switch circuit means for controlling a warning device, said latching switch circuit including an input, wherein an output of said further operational amplifier is connected to the input of said latching switch circuit means for controlling a warning device.

12. Apparatus as claimed in claim 11 in which the switch circuit comprises: an input transistor biased to a non-conductive state, but having its base connected to the output of said further operational amplifier so as to be rendered conductive in the event that the output of said further operational amplifier exceeds a predetermined level; a feedback transistor connected to the input transistor so as to be turned on when the input transistor is turned on, and to provide current to the base of the input transistor to latch it in its on condition; and an output transistor drivingly connected to said warning means and having its base connected to the input transistor so as to drive said warning means whenever the input transistor is on.

13. Apparatus as claimed in claim 8 in which the collector-emitter path of said transistor, the probe and a resistor in that order are connected in series across a supply, the junction of said resistor and the probe being connected to said other input of the operational amplifier so that the voltage signal applied to the latter is related to the current through the probe.

14. Apparatus as claimed in claim 13 in which the differentiating circuit comprises a differentiating capacitor and a differentiator resistor in series with each other, the differentiating capacitor being connected to the junction of the probe and the collector-emitter path of the tramnsistor and the differentiator resistor being connected to one terminal of the supply, said differentiating circuit comprising a further operational amplifier having its inverting input connected to the junction of said differentiating capacitor and said differentiator resistor by an input resistor and an integrating capacitor connected between the inverting input of said further operational amplifier and the output thereof.

15. Apparatus as claimed in claim 14 further including a latching switch circuit means for controlling a warning device, said latching switch circuit including an input, wherein an output of said further operational amplifier is connected to the input of said latching switch circuit means for controlling a warning device.

16. Apparatus as claimed in claim 15 in which said latching switch circuit comprises: an input transistor biased to a non-conductive state and connected to the output of said further operational amplifier so as to be turned on when the output voltage of said further operational amplifier rises as a result of the probe being immersed; a second transistor biased off but connected to the input transistor so as to be turned on when the input transistor turns on; an output transistor biased on and feeding said warning means but connected to the second transistor to be turned off when the second transistor is turned on; and a feedback connection from the output transistor to the base of the second transistor to maintain said second transistor in a conductive state when the output transistor turns off.

17. Apparatus as claimed in claim 7 further comprising timing means for determining said test period.

18. Apparatus as claimed in claim 17 in which said timing means comprises: a timing capacitor and a timing resistor in series across a regulated supply, and diode gate means connecting the junction of the timing capacitor and the timing resistor to said other input terminal of said operational amplifier, whereby the output of the operational amplifier is driven to a condition in which said control element is rendered non-conductive when the voltage across said timing capacitor reaches a predetermined level.

19. Apparatus as claimed in claim 18, in which the voltage sensitive means also includes an active integrating circuit connected to the output of the differentiating circuit, and further comprising a further diode gate means connecting the junction of the timing capacitor and the timing resistor to the input of said active integrating circuit so as to render the latter inoperative when the voltage or the timing circuit exceeds a preset level.

20. Apparatus as claimed in claim 19 further comprising means for applying different reference voltage signals to the operational amplifier and the active integrating circuit so that the latter is rendered inoperative by the timing means before the control element is rendered non-conductive.

21. Apparatus as claimed in claim 7 further comprising a latching switch circuit means for operating a warning means when the rate of change of said voltage signal indicates that the probe is not immersed; a diode in series with the probe and the control element; and means, sensitive to the voltage across said diode and connected to said latching switch circuit, for overridingly activating said warning means when the diode is not forwardly biased.

* * * * *